United States Patent
Bujewicz et al.

(10) Patent No.: US 11,359,731 B2
(45) Date of Patent: Jun. 14, 2022

(54) SERVO VALVE ASSEMBLY

(71) Applicant: Hamilton Sundstrand Corporation, Charlotte, NC (US)

(72) Inventors: Maciej Bujewicz, Wroclaw (PL); Marcin Korczynski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/064,932

(22) Filed: Oct. 7, 2020

(65) Prior Publication Data
US 2021/0108735 A1    Apr. 15, 2021

(30) Foreign Application Priority Data
Oct. 12, 2019 (EP) .................... 19461588

(51) Int. Cl.
*F16K 11/07* (2006.01)
(52) U.S. Cl.
CPC .............. *F16K 11/0712* (2013.01)
(58) Field of Classification Search
CPC .............. F16K 11/0712; F16K 31/02
See application file for complete search history.

(56) References Cited

U.S. PATENT DOCUMENTS

| | | |
|---|---|---|
| 2,152,084 A | 3/1939 | Pane |
| 2,969,045 A | 1/1961 | Clar |
| 3,017,865 A * | 1/1962 | Frantz ............ F15B 21/10 |
| | | 92/9 |
| 3,799,203 A | 3/1974 | Doutt |
| 7,096,658 B2 | 8/2006 | Wernberg et al. |
| 9,404,513 B2 | 8/2016 | Baker et al. |
| 10,197,178 B2 | 2/2019 | Rateick et al. |
| 2004/0134547 A1 | 7/2004 | Moreno et al. |
| 2016/0160886 A1 | 6/2016 | Baker |

(Continued)

FOREIGN PATENT DOCUMENTS

| | | |
|---|---|---|
| CN | 106958667 A | 7/2017 |
| DE | 212015000163 U1 | 2/2017 |

(Continued)

OTHER PUBLICATIONS

European Search Report for Application No. 19461588.6, dated Apr. 22, 2020, 10 pages.

*Primary Examiner* — Kevin R Barss
(74) *Attorney, Agent, or Firm* — Cantor Colburn LLP

(57) ABSTRACT

A servo valve assembly includes a housing defining a cylindrical cavity having a central axis, and a spool disposed in the cavity and co-axially aligned with the central axis. A pair of transition portions define opposing conical cavity surfaces each connect a respective one of first and second cylindrical cavity portions with a third cylindrical cavity portion. The spool comprises a pair of blocking members projecting radially, and each of the blocking members defines a conical blocking surface opposing a respective one of the conical cavity surfaces to define a fluid flow passage therebetween. A cone angle of each conical blocking surface relative to the central is equal to a cone angle of the opposing conical cavity surface relative to the central axis. The spool is moveable along the central axis to vary a flow area of the flow passages between the conical blocking surfaces and the conical cavity surfaces.

13 Claims, 7 Drawing Sheets

(56) References Cited

U.S. PATENT DOCUMENTS

| | | |
|---|---|---|
| 2018/0335162 A1 | 11/2018 | Brewer et al. |
| 2018/0346129 A1 | 12/2018 | Kozlowski et al. |
| 2018/0347721 A1 | 12/2018 | Kozlowski et al. |
| 2019/0048900 A1 | 2/2019 | Kozlowski et al. |
| 2019/0264823 A1* | 8/2019 | Itoh .................... F16K 31/0613 |

FOREIGN PATENT DOCUMENTS

| | | |
|---|---|---|
| EP | 1484540 A1 | 12/2004 |
| FR | 2383372 A1 | 10/1978 |
| JP | S5642767 A | 4/1981 |

* cited by examiner

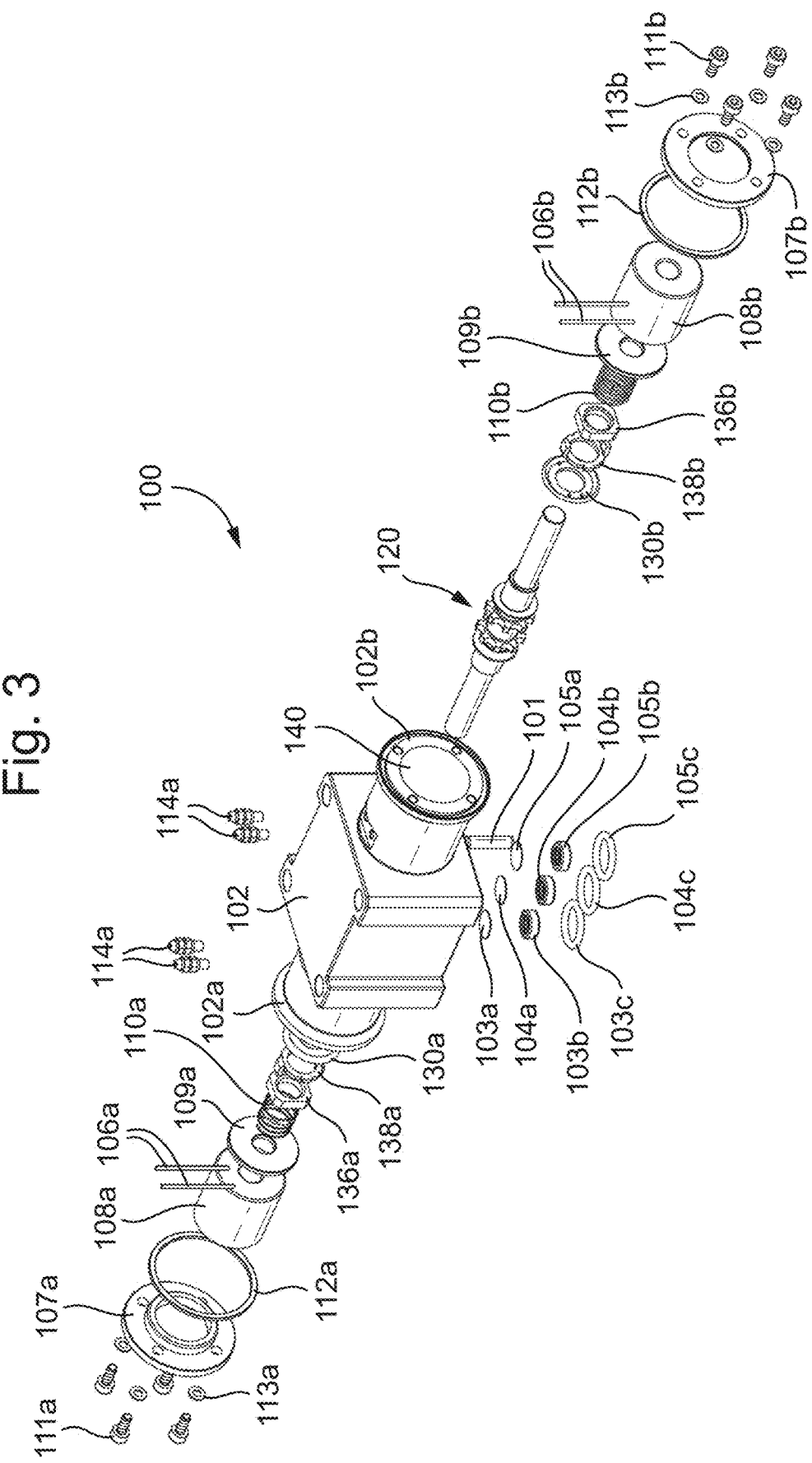

SERVO VALVE ASSEMBLY

FOREIGN PRIORITY

This application claims priority to European Patent Application No. 19461588.6 filed Oct. 12, 2019, the entire contents of which is incorporated herein by reference.

TECHNICAL FIELD

This disclosure relates generally to a servo valve assembly. This disclosure also relates to a servo valve comprising the servo valve assembly and a method of controlling the servo valve assembly.

BACKGROUND

Servo valves are generally used when accurate position control is required, such as, for example, control of a primary flight surface. Servo valves can be used to control pneumatic or hydraulic actuators or motors. They are common in industries which include, but are not limited to, automotive systems, aircraft and the space industry.

A known type of servo valve has a flapper and nozzle arrangement.

FIG. 1 shows generally a known arrangement of a flapper and nozzle servo valve 20. Servo valve 20 comprises a flapper 201 disposed in a flapper cavity 208c, a pair of nozzles 206 disposed in a nozzle housing 208, and an electromagnet 205 surrounding an armature 202. The armature 202 has opposed tips 202a, 202b which protrude through gaps 205b in a housing 205a surrounding the electromagnet 205, and which are arranged to leave spaces 203a, 203b, 203c, 203d between the armature 202 and the housing 205a.

The electromagnet 205 is connected to an electrical input (not shown) and the armature 202 is connected in a perpendicular manner to the flapper 201, or is an integral part of the flapper 201—the integral part being perpendicular to the flapper 201. The electromagnet 205 includes coils (not shown) that surround the armature 202 and a set of permanent magnets (not shown) that surround the coils. When a current is applied to the coils from the electrical input, magnetic flux acting on the ends of the armature 202 is developed. The direction of the magnetic flux (force) depends on the sign (direction) of the current. The magnetic flux will cause the armature tips 202a, 202b to be attracted to the electromagnet 205 (current direction determines which magnetic pole is attracting and which one is repelling) thus varying the size of the spaces 203a, 203b, 203c, 203d. This magnetic force creates an applied torque on the flapper 201, which is proportional to applied current. The flapper 201 rotates and interacts with the nozzles 206.

Nozzles 206 are housed within a respective nozzle cavity 210 in the housing 208, and comprise a fluid outlet 206a and fluid inlet 206b. Housing 208 also has a port 208a, which allows communication of fluid to the nozzles 206. The flapper 201 comprises a blocking element 201a at an end thereof which interacts with fluid outlets 206a of nozzles 206 to provide metering of fluid from the fluid outlets 206a to a fluid port 208b in the housing 208. Fluid port 208b in turn allows communication of fluid pressure downstream to a spool valve and actuator arrangement (not shown). The positioning of the flapper 201 between nozzles 206 (controlled by the movement of the armature 202 via electromagnet 205) will control the amount of fluid pressure communicated to the spool valve and actuator arrangement (not shown), which can be used to control actuator movement.

Although the flapper and nozzle type of servo valve arrangement shown in FIG. 1 can be effective at controlling an actuator, it has been found that limitations nevertheless exist. For example: in order to provide the correct limitations on flapper 201 and armature 202 movement, the spaces 203a, 203b, 203c, 203d must be calibrated to very tight tolerances, as must the spacing of the nozzles 206 from the flapper 201. Moreover, there is also a general desire to reduce servo valve weight and simplify its manufacture, construction and operation, as well as improve the operational pressures and frequencies that may be realised with such servo valve arrangements.

The present disclosure aims to provide a servo valve assembly that improves on the above, by replacing the flapper and nozzle arrangement with a different construction.

SUMMARY

From one aspect, the present disclosure provides a servo valve assembly comprising a housing defining a cylindrical cavity having a central axis. The cavity includes a first cylindrical portion having a first diameter, a second cylindrical portion having a second diameter, a third cylindrical portion arranged axially between the first and second cylindrical portions having a third diameter smaller than the first and second diameters. A pair of transition portions defining opposing conical cavity surfaces that each connect a respective one of the first and second cylindrical portions with the third cylindrical portion. A spool is disposed in the cavity and co-axially aligned with the central axis. The spool comprises a pair of blocking members projecting radially therefrom, and each of the blocking members defines a conical blocking surface opposing a respective one of the conical cavity surfaces to define a fluid flow passage therebetween. A cone angle of each conical blocking surface relative to the central axis is equal to a cone angle of the opposing conical cavity surface relative to the central axis. The spool is moveable along the central axis to vary a flow area of the flow passages between the conical blocking surfaces and the conical cavity surfaces.

In one example, the spool further comprises a pair of retaining lands extending radially from the spool and disposed axially inboard of the blocking members, the retaining lands each contacting a respective one of the blocking members to provide support thereto and configured to allow fluid communication from the flow passages to the third cylindrical portion.

In a further example of any of the above, the retaining lands each comprise a conical surface around their circumference.

In a further example of the above, each conical surface has a cone angle relative to the central axis that is equal to the cone angle of the conical blocking surface of the respective blocking member.

In a further example of any of the above, the spool further comprises a pair of guiding lands extending radially from the spool and disposed in the third cylindrical portion. The pair of guiding lands are configured to contact a cavity surface defining the third cylindrical portion to support the spool in place along the central axis. The guiding lands each define a plurality of circumferentially extending guiding surfaces spaced circumferentially apart by a plurality of grooves that extend axially through the guiding lands. The guiding surfaces contact the cavity surface defining the third cylindrical portion and the plurality of grooves allow fluid communication axially across the guiding lands.

In a further example of the above, the plurality of guiding surfaces and the plurality of grooves are equally spaced around the circumference of the guiding lands.

In a further example of any of the above, the housing further comprises a fluid supply port opening into the first cylindrical portion, a fluid return port opening into the second cylindrical portion and a fluid control port opening into the third cylindrical portion.

In a further example of any of the above, the assembly further comprises a pair of opposing biasing members that are configured to bias the spool in opposing axial directions along the central axis such that each conical blocking surface is biased towards the opposing conical cavity surface.

In a further example of the above, a first of the pair of biasing members is disposed in the first cylindrical portion and a second of the pair of biasing members is disposed in the second cylindrical portion, and the second biasing member is configured to provide a greater biasing force than the first biasing member.

In a further example of any of the above, the assembly further comprises a coil surrounding a first portion of the spool. The coil and the spool are configured to generate an electromagnetic force that moves the spool along the central axis when the coil is energised with an electric current to vary the flow area of the flow passages between the conical blocking surfaces and the conical cavity surfaces.

In a further example of the above, the coil comprises a pair of coils spaced axially apart and outboard of the blocking members, each coil surrounding opposing axial portions of the spool.

In a further example of the above, the cavity further comprises a fourth cylindrical portion and a fifth cylindrical portion axially outboard of the first and second cylindrical portions, wherein a respective one of the pair of coils is disposed in the fourth and fifth cylindrical portions.

In a further example of any of the above, the spool comprises a soft magnetic material, for example, a stainless steel alloy.

In a further example of any of the above, the blocking members are conical washers. In a further example, the conical washers are made of a stainless steel alloy.

From another aspect, the present disclosure provides a servo valve comprising the servo valve assembly of any of the above examples.

From yet another aspect, the present disclosure provides a method of controlling the servo valve assembly of any of the above examples. The method comprises applying an electric current to the coil to generate an electromagnetic force that moves the spool along the central axis in a first axial direction; reversing the polarity of the electric current; and applying the reversed polarity electric current to the coil to generate an electromagnetic force that moves the spool along the central axis in a second axial direction opposite the first axial direction.

BRIEF DESCRIPTION OF THE DRAWINGS

FIG. 3 shows an exploded view of the servo valve assembly of FIG. 2.

DETAILED DESCRIPTION

Figure 1:
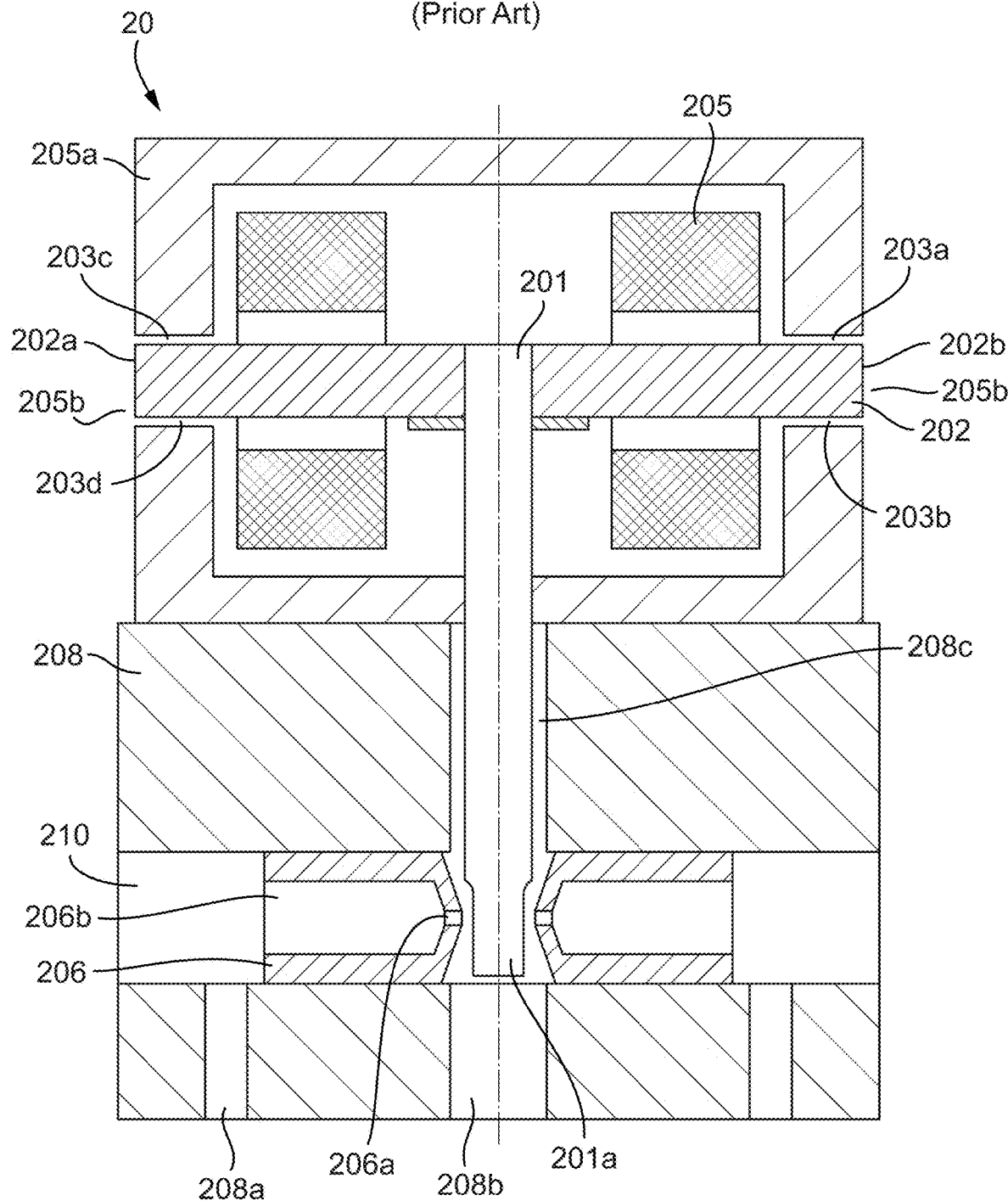
FIG. 1 shows a known arrangement of a flapper and nozzle servo valve.
Figure 2:
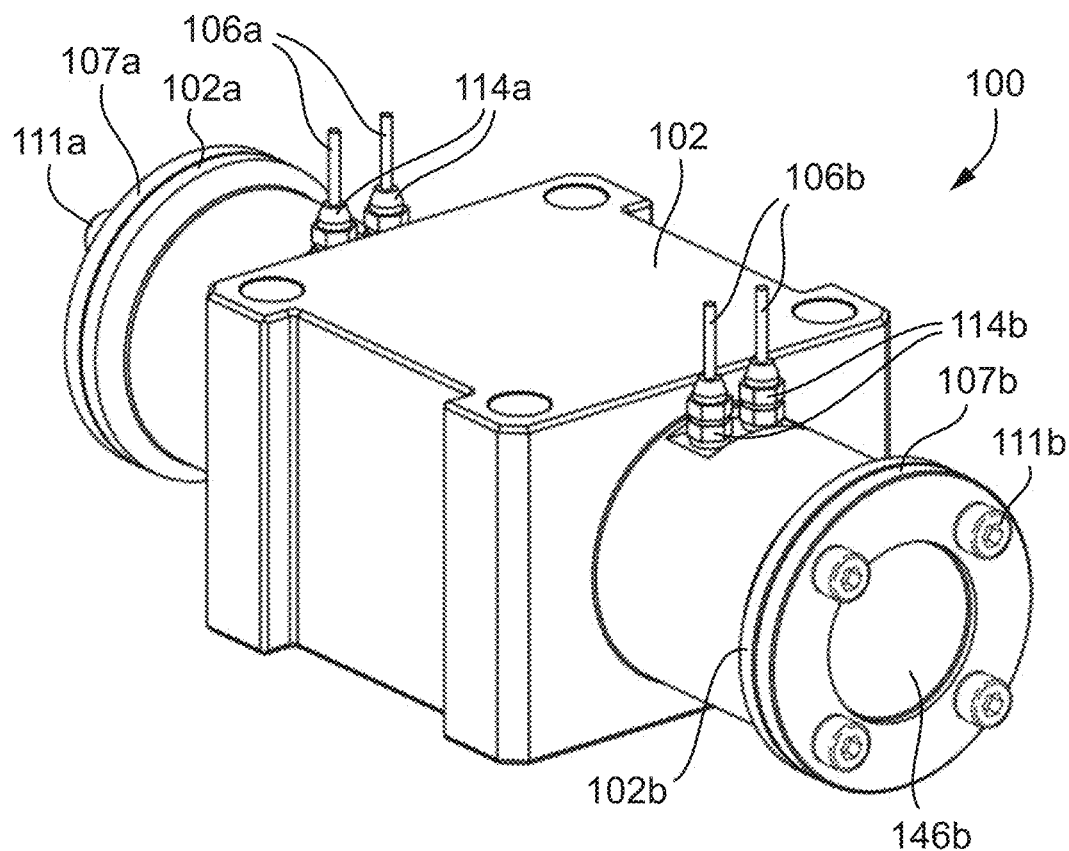
FIG. 2 shows an example of a servo valve assembly in accordance with the present disclosure from the exterior.

With reference to FIGS. 2, 3 and 4A-4D, there is shown an example of a servo valve assembly 100 in accordance with the present disclosure. The depicted servo valve assembly 100 may be suitable for use with either a pneumatic or hydraulic system, and thus, may be used in conjunction with any suitable pressurised fluid e.g. pressurised gas, such as air, or a pressurised liquid, e.g. hydraulic fluid or fuel.

The servo valve assembly 100 comprises a housing 102. A pin 101 is provided in the base of the housing 102 for connecting the housing 102 to a further downstream component, for example, to a spool valve and actuator arrangement (not shown). Although pin 101 is depicted, any suitable connection means between the housing 102 and a downstream component can be used (e.g. welding), or in an alternative example, the housing 102 may be an integral part of the downstream component (e.g. providing a one-piece servo valve).

The housing 102 includes a fluid supply port 103, a fluid control port 104 and a fluid return port 105 that are configured to allow communication of pressurised fluid between the servo valve assembly 100 and the downstream component. Each port 103, 104, 105 includes a filter screen 103a, 104a, 105a and a screen ring 103b, 104b, 105b (or other suitable means) holding it in place. The filter screens 103a, 104a, 105a allow the filtering out of contaminants from the pressurised fluid during use of the servo valve assembly 100. Each port 103, 104, 105 also includes an O-ring seal 103c, 104c, 105c that provides a seal between the ports 103, 104, 105 and the downstream component (not shown) they are connected to prevent pressurised fluid leaking from the servo valve assembly 100.

Figure 4A:
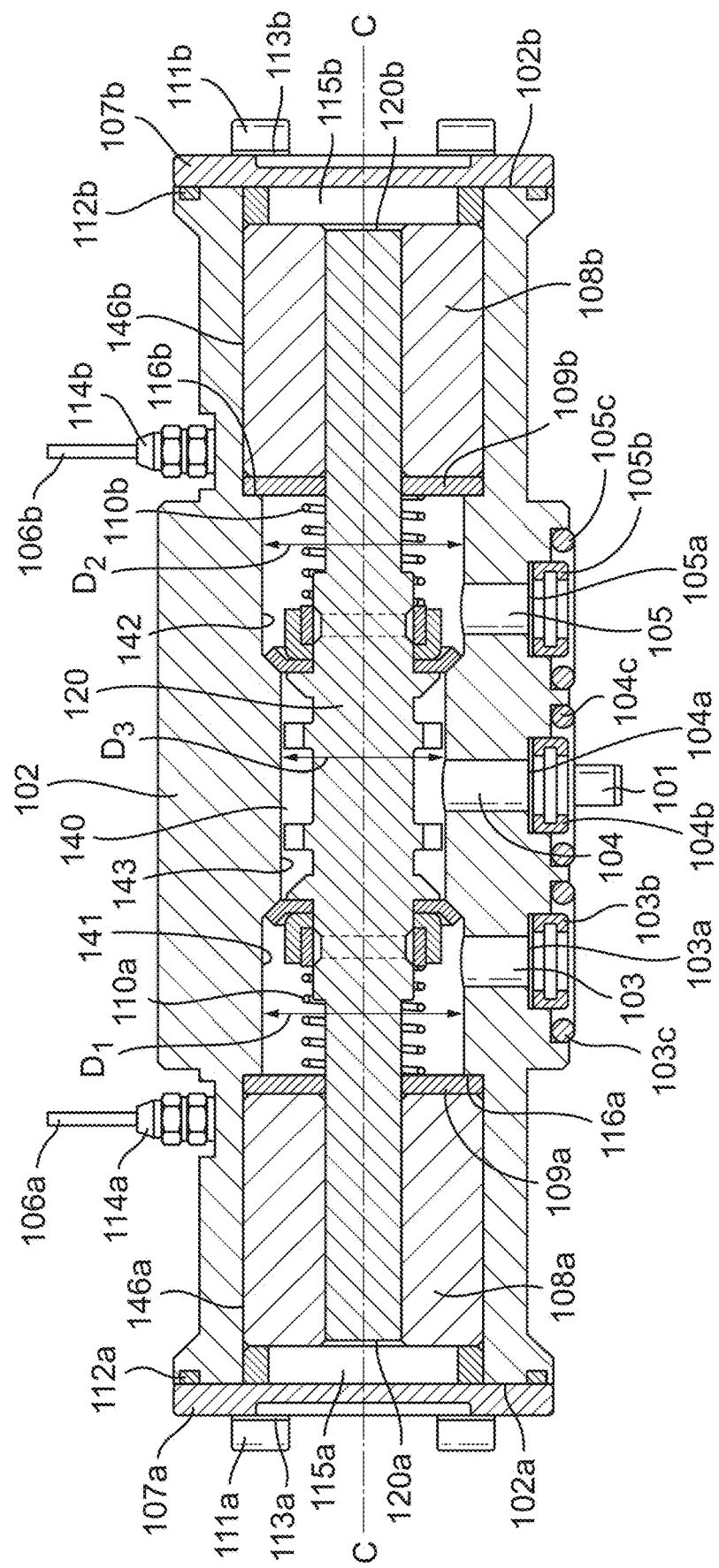
FIG. 4A is a cross-sectional view of the servo valve assembly of FIG. 2 along line 4-4.
Figure 4B:
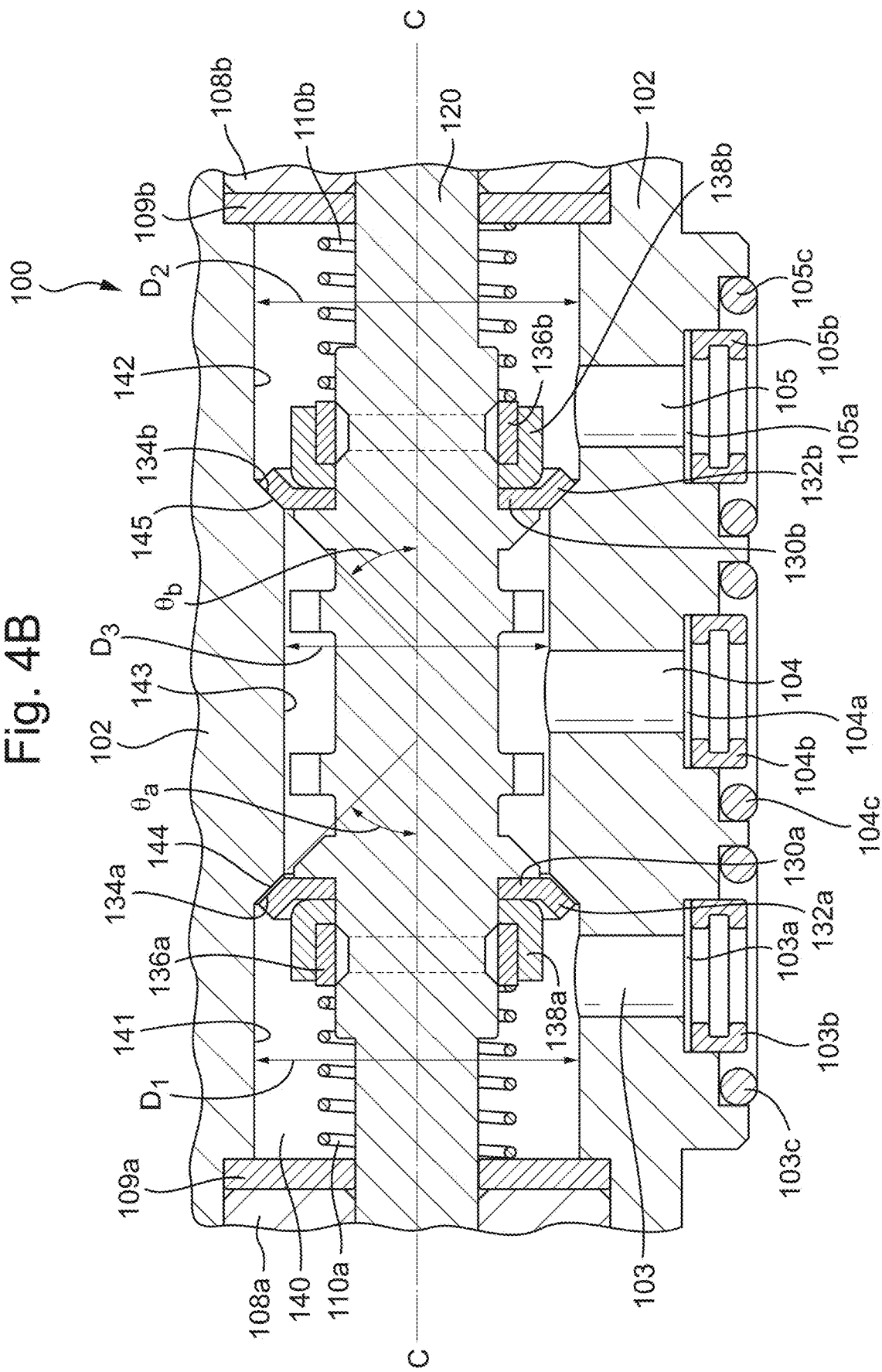
FIG. 4B is a magnified view of a portion of FIG. 4A.

The housing 102 defines a cylindrical cavity 140 with a central axis C-C extending between opposing axial ends 102a, 102b of the housing 102. The cavity 140 includes a first cylindrical portion 141 having a first diameter D1, a second cylindrical portion 142 having a second diameter D2 and a third cylindrical portion 143 arranged axially between the first and second cylindrical portions 141, 142 having a third diameter D3. The third diameter D3 is smaller than the first and second diameters D1, D2. Although diameters D1 and D2 are depicted as being the same, they may be a different diameter to each other, as long as they are both greater than the third diameter D3. As shown in FIGS. 4A and 4B, in the depicted example, the supply port 103 opens into the first cylindrical portion 141, the return port 105 opens into the second cylindrical portion 142 and the control port 104 opens into the third cylindrical portion 143.

A pair of transition portions define opposing conical cavity surfaces 144, 145 that each connect a respective one of the first and second cylindrical portions 141, 142 with the third cylindrical portion 143. The conical cavity surfaces 144, 145 define a respective cone angle θa, θb relative to the central axis C-C. The cone angle θa, θb represents the angle between the surfaces 144, 145 and the central axis C-C. As will be apparent to the skilled person, in order to form a conical surface, the cone angle θa, θb must necessarily be greater than 0° and smaller than 90° (i.e. an acute angle). Cone angle θa, θb can be any suitable angle, but in particular examples the conical surfaces 144,145 may be sized and sloped to provide cone angles θa, θb between 20° to 70°, 30° to 60°, 40° to 50° or about 45°. Moreover, although cone angles θa, θb are depicted as being equal to each other, in other examples, these angles may be different to each other.

A spool 120 is disposed in the cavity 140 and is co-axial with the central axis C-C. The spool 120 defines opposing axial ends 120a, 120b and is moveable along the central axis C-C in either axial direction (i.e. left and right in the FIGS. 4A and 4B).

The spool 120 comprises a pair of blocking members 130a, 130b projecting radially therefrom. Each of the blocking members 130a, 130b defines a conical portion 132a, 132b that provides a conical blocking surface 134a, 134b opposing a respective one of the conical cavity surfaces 144, 145. The conical blocking surfaces 134a, 134b also define cone angles θa, θb in the same manner as the conical cavity surfaces 144, 145. The cone angles θa, θb of each conical blocking surface 134a, 134b are equal to that of the cone angle θa, θb of the respective opposing conical cavity surface 144, 145. In this manner, the conical blocking surfaces 134a, 134b provide a matching conical profile to that of the conical cavity surfaces 144, 145.

Depending on the axial position of the spool 120, a fluid flow passage 150 is provided between each of the conical blocking surfaces 134a, 134b and the respective conical cavity 144, 145. The fluid flow passage 150 defines a fluid flow area between the conical blocking surfaces 134a, 134b and the conical cavity surfaces 144, 145 that allows fluid communication of pressurised fluid F between the first and second cylindrical portions 141, 142 of the cavity 140 to the third cylindrical portion 143 of the cavity 140.

Figure 4C:
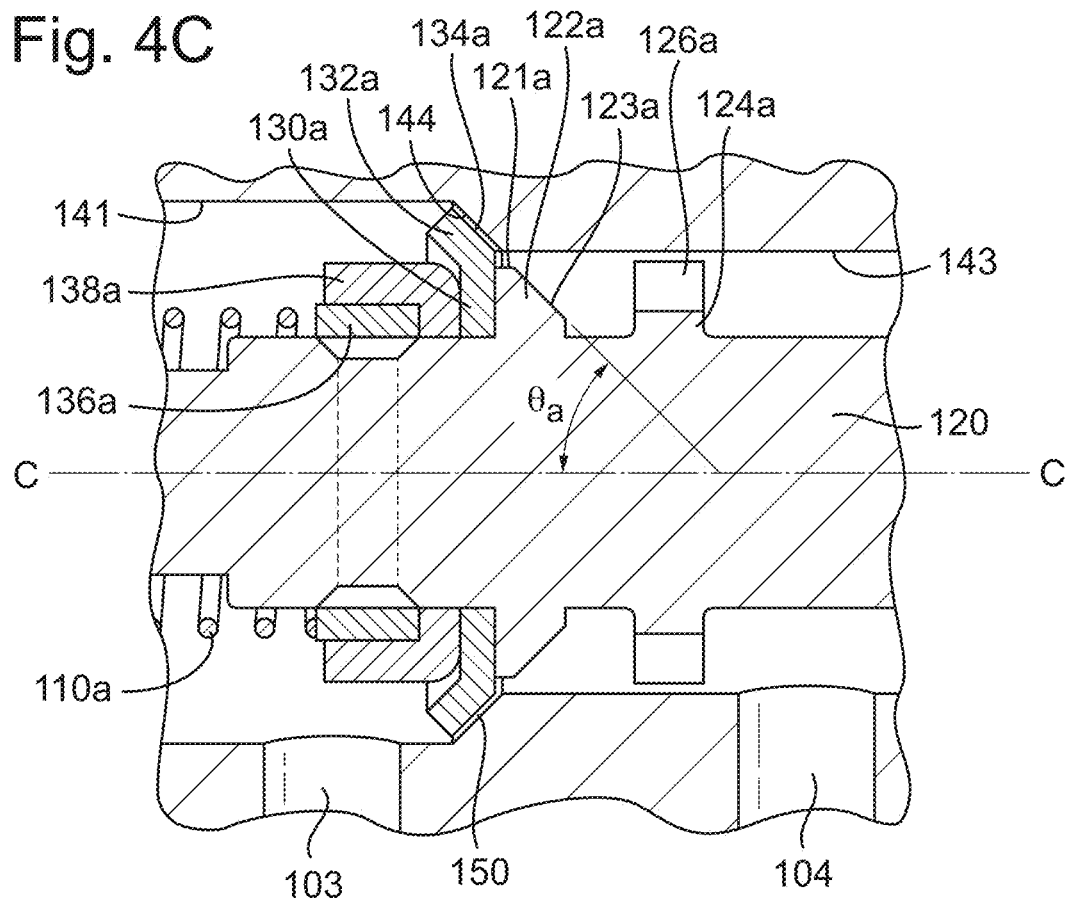
FIG. 4C is a magnified view of a portion of FIG. 4B.
Figure 4D:
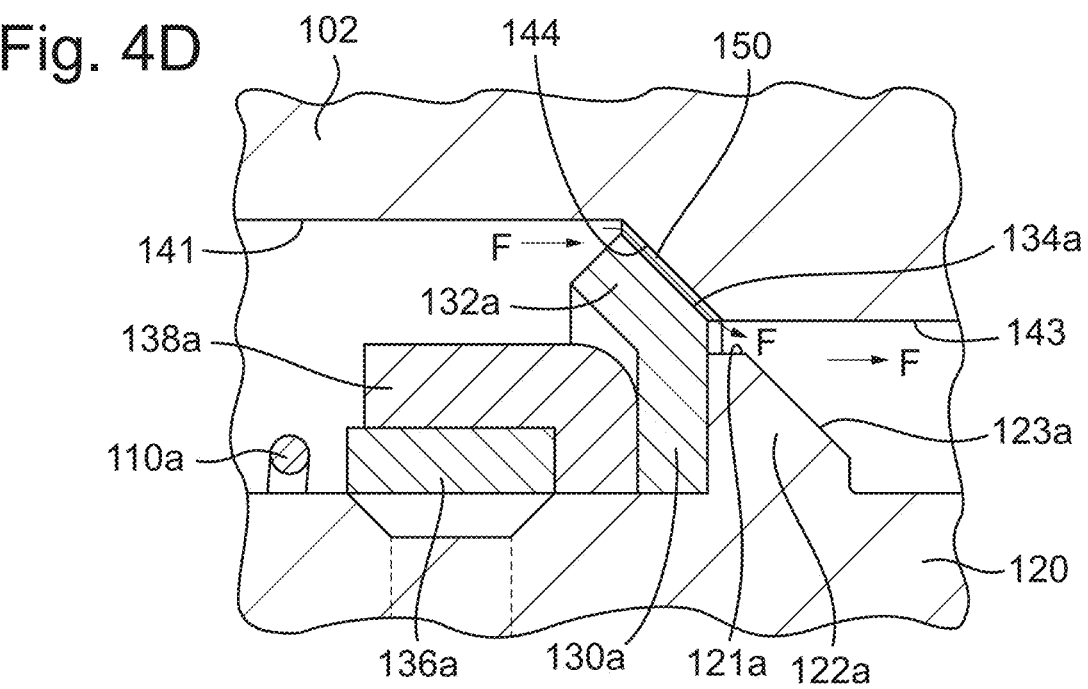
FIG. 4D is a magnified view of a portion of FIG. 4C.

The flow area of the fluid flow passages 150 can be varied depending on the axial position of the spool 120. For instance, if the spool 120 is moved in a first axial direction (i.e. to the left in FIGS. 4A and 4B) until the blocking surface 134b contacts the cavity surface 145, the flow passage 150 between surfaces 134a and 144 will be at a maximum flow area, whilst there will no longer be a flow passage 150 defined between the surfaces 134b, 145 (i.e. this passage has a fluid flow area of zero). This positioning is shown in FIGS. 4C and 4D. Of course, if the spool 120 is moved in a second, opposite axial direction (i.e. to the right in FIGS. 4A and 4B) until the blocking surface 134a contacts the cavity surface 144, the opposite will be true, and the flow area of the flow passage 150 between surfaces 134b, 145 will be at a maximum, whilst a flow passage 150 between the surfaces 134a, 144 will no longer be defined. In operation, such spool positions would provide maximum supply fluid pressure and maximum return fluid pressure to the downstream component, respectively. The spool 120 can be moved between these positions in order to allow full control of the amount of supply vs return fluid pressure from the ports 103, 105 provided to the downstream component via the control port 104, e.g. to control movement thereof. When the spool 120 is in a neutral (or "null") position, the flow passage 150 between the surfaces 134a, 144 and 134b, 145 will provide an equal flow area, and will allow equal supply and return fluid pressures to be communicated to the control port 104.

It is to be appreciated that the conical and matching nature of the profile of the surfaces 134a, 134b and 144, 145 allows more precise adjustment of the fluid flow area between the fluid passages 150 and improves the fluid flow characteristics through the servo valve assembly 100.

In the depicted example, the blocking members 130a, 130b are conical washers that are secured in place around the spool 120 between respective retaining lands 122a, 122b extending radially from the spool 120 on one axial side thereof and a spool washer 138a, 138b and nut 136a, 136b on the opposite axial side thereof. The nut 136a, 136b is fixedly attached to the spool 120 (e.g. via threaded engagement, brazing, welding or an inference fit, such as shrink fitting) to apply a clamping force on the blocking members 130a, 130b to hold them in place against the retaining lands 122a, 122b. In this manner, the blocking members 130a, 130b are held in contact with the retaining lands 122a, 122b.

The blocking members 130a, 130b, washers 138a, 138b and nuts 136a, 136b may be formed of any suitable material depending on the intended operational environment and parameters of the servo valve assembly 100. In the depicted example, a corrosion resistant structural metal, for example, a stainless steel is utilised.

With reference to FIGS. 4C, 4D, 5A and 5B, the retaining lands 122a, 122b are configured to support the blocking members 130a, 130b, whilst still permitting fluid flow F from the flow passages 150 to the third cylindrical portion 143 for servo valve assembly 100 operation. Accordingly, the retaining lands 122a, 122b extend radially to define a diameter that is less than D3.

The retaining lands 122a, 122b define a planar surface 121a (extending in an axial direction) and a conical surface 123a around their circumference (i.e. around a radially outer surface of the lands 122a, 122b). Although any suitable shape of retaining land 122a, 122b may be used, the conical surfaces 123a of the depicted lands 122a, 122b allow improved fluid flow characteristics through the servo valve assembly 100. Any suitable cone angle of conical surfaces 123a relative to the central axis C-C may be used. However, in the depicted example, the conical surfaces 123a share the same cone angle θa, θb as the blocking member 130a, 130b that they respectively contact in order to provide increased consistency in the flow rate provided across the conical surfaces 123a, 134a, 134b.

The retaining lands 122a, 122b are formed from axially extending collars 125a, 125b that surround and are fixedly attached to the spool 120 via any suitable method (e.g. via brazing, welding or an interference fit, such as shrink fitting). In other examples, however, the retaining lands 122a, 122b may be integrally formed with the spool 120.

Although spool washer 138a, 138b, nut 136a, 136b and retaining land 122a, 122b are depicted for securing the blocking members 130a, 130b in place around the spool 120, the blocking members 130a, 130b may be secured to the spool 120 in any other suitable manner. For instance, the blocking member 130a, 130b may be fixedly attached to the spool 120 directly, without the need for spool washer 138a, 138b, nut 136a, 136b and/or retaining land 122a, 122b to hold it in place. Such fixed attachment could be provided e.g. via brazing, welding or interference fitting (e.g. shrink fitting) the blocking member 130a, 130b to the spool 120. In other examples, the blocking members 130a, 130b may be an integral part of the spool 120, rather than being a separate component attached thereto. In the above other examples, the retaining land 122a, 122b may nevertheless be retained, e.g. if desired for flow characteristic reasons.

At the first axial end 102a of the housing 102, a fourth cylindrical portion 146a of the cavity 140 is defined, and at the second, opposing axial end 102b of the housing 102 a fifth cylindrical portion 146b of the cavity 140 is defined. Fourth and fifth cylindrical portions 146a, 146c are arranged axially outboard of the first and second cylindrical portions 141, 142.

First and second coils 108a, 108b are arranged co-axially surrounding the spool 120. The first and second coils 108a, 108b are axially outboard of the blocking members 130a, 130b and biasing members 110a, 110b, and are disposed in the fourth and fifth cylindrical portions 146a, 146b, respectively. In this manner, the coils 108a, 108b surround respective portions of the spool 120 adjacent the axial ends 120a, 120b of the spool 120.

The coils 108a, 108b surrounding the spool 120 are connected to respective wires 106a, 106b that are secured to the housing 102 by threaded connectors 114a, 114b. The wires 106a, 106b are operatively connected to an electrical supply (not shown) to allow the energisation of the coils 108a, 108b by an electrical current. The coils 108a, 108b and the spool 120 are configured to generate an electromagnetic force that moves the spool 120 along the central axis C-C when one of the coils 108a, 108b is energised. In other words, the coils 108a, 108b are solenoid coils that produce a magnetic force in response to energisation from the electrical current, and the spool 120 comprises a soft magnetic material that responds to the magnetic force, either by attraction or repulsion, to move it along the central axis C-C. In the depicted example, the spool 120 is made of a suitable soft magnetic material, such as a stainless steel. However, in other examples, any suitable method and/or material for achieving the electromagnetic force may be utilised, for example, the spool 120 may have a suitable soft magnetic material portion attached thereto, instead of the spool 120 being made of the material itself.

Changing the amount and/or polarity of the electrical current used to energise the coils 108a, 108b is used to change the amount and direction of spool movement along the central axis C-C. In this manner, energisation of the coils 108a, 108b can be used to vary the size of the flow areas defined between the flow passages 150 between the conical blocking surfaces 134a, 134b and the conical cavity surfaces 144, 145 (as discussed above).

As will be appreciated from the above, although two coils 108a, 108b are depicted, only one coil is necessary for the servo valve assembly 100 to operate (e.g. by switching the polarity of the current supplied to the coil the spool 120 can be moved in either axial direction). The second coil in the depicted example is used to provide redundancy, in the event the first coil should fail. Although the coils 108a, 108b surround portions of the spool 120 adjacent axial ends 120a, 120b thereof, any suitable placement of coils 108a, 108b may be used to achieve the operation discussed below.

The depicted coils 108a, 108b surrounding the spool 120 provide an annulus around the spool 120 that is sized to allow the spool 120 to move axially through it, without contacting the coils 108a, 108b. This will prevent spool 120 movement along the central axis C-C interfering with the arrangement of the coils 108a, 108b. If the coils 108a, 108b are encased, e.g. in a jacket material, then the jacket material may be provided with a similarly sized annulus, in order to prevent wear of the jacket material from spool 120 movement and the generation of unwanted friction therebetween. Alternatively, the jacket material may be sized such that the annulus thereof provides some supporting contact to the spool 120 to help keep it centred along the central axis C-C.

The fourth and fifth cylindrical portions 146a, 146b of the cavity 140 may have any suitable diameter necessary to house the coils 108a, 108b around the spool 120. In the depicted example, however, the fourth and fifth cylindrical portions 146a, 146b have diameters that are greater than the first and second diameters D1, D2. In this manner, a first annular step 106a is formed between the fourth cylindrical portion 146a and the first cylindrical portion 141 and a second annular step 106b is formed between the fifth cylindrical portion 146b and the second cylindrical portion 142.

Retention members 109a, 109b are provided between the coils 108a, 108b and the annular steps 106a, 106b. The depicted retention members 109a, 109b are annular washers surrounding the spool 120, although any suitable annular member may be used.

In the depicted example, the annulus of the retention members 109a, 109b is sized to allow the spool 120 to move axially through it, without contacting the retention members 109a, 109b and generating undue friction therebetween. Arranging the retention members 109a, 109b in this manner will reduce the force that need be applied to the spool 120 in order to move it axially along the central axis C-C, and may improve its movement sensitivity. In other examples, however, the retention members 109a, 109b may be alternatively configured to provide some supporting contact to the spool 120 to help keep it centred along the central axis C-C (in the same manner as the jacket material discussed above). As with the jacket material, the amount of contact may be configured to provide a balance between providing adequate support, without generating too much undue friction during spool movement.

End caps 107a, 107b are provided at the opposing axial ends 102a, 120b of the housing 102. End caps 107a, 107b seal the housing 102 from the surroundings of the servo valve assembly 100 and hold the coils 108a, 108b in place against the retention members 109a, 109b. End caps 107a, 107b define an axial gap 115a, 115b between the axial ends 120a, 120b of the spool 120, that allow for spool movement along the central axis C-C. The end caps 107a, 107b feature O-ring seals 112a, 112b to aid providing of a hermetic seal between the caps 107a, 107b and the axial ends 102a, 102b of the housing 102. The end caps 107a, 107b are fastened in place by respective threaded fasteners 111a, 111b and washers 113a, 113b that threadably engage with the axial ends 102, 102b of the housing 102. The threaded fasteners 111a, 111b allow the end caps 107a, 107b to be removed for maintenance of the servo valve assembly 100. However, any other suitable fastening mechanism may be used to secure the end caps 107a, 107b in place, e.g. rivets, welding etc. O-ring seals 112a, 112b may be copper seals, or may be any other suitable type of seal (e.g. rubber). In some examples, O-ring seals 112a, 112b may not be necessary, as the fastening of the end caps 107a, 107b to the housing 102 may provide enough sealing on its own.

Biasing members 110a, 110b are provided to bias the spool 120 in opposing axial directions along the central axis C-C. In the depicted example, biasing members 110a, 110b are co-axial with the central axis C-C and are disposed in respective ones of the first and second cylindrical portions 141, 142 between retention members 109a, 109b and nuts 136a, 136b, such that each conical blocking surface 134a, 134b is biased towards the respective opposing conical cavity surface 144, 145. In other examples, any other suitable positioning and/or way of retaining biasing members 110a, 110b to exert the opposing biasing forces on the spool 120 may be used. For example, the biasing members 110a, 110b may exert a biasing force directly on the blocking members 130a, 130b or an integral part of the spool 120 and/or may be parallel to the central axis C-C, but not co-axial therewith. In other examples, the biasing members 110a, 110b may not be parallel to the central axial C-C but exert a biasing force with a directional component along the central axis C-C.

The biasing members 110a, 110b are configured to bias the spool 120 towards the aforementioned neutral position. As will be appreciated by the skilled person, such bias force will need to be calibrated to account for the relative fluid pressures that also act on the spool 120 in operation (i.e. from the supply and return ports 103, 105). Usually, in operation, the supply fluid pressure from the supply port 103 is greater than the return fluid pressure from the return port 105. Therefore, the biasing member 110b opposing the supply fluid pressure normally needs to exert a higher biasing force than the opposing biasing member 110a that opposes the return fluid pressure. Nonetheless, in other examples, any suitable differential of biasing forces can be used between members 110a, 110b, or the biasing forces exerted therefrom may be equal instead. In the depicted example, the biasing members 110a, 110b are helical springs, and the spring 110b is configured to be stiffer than spring 110a (indicated by the increased thickness of its cross-section as can be seen in FIGS. 4A and 4B). Although helical springs are depicted, in other examples, any other suitable biasing member may be used (e.g. bellows or disc springs) in order to achieve the required biasing forces on the spool 120.

As will be appreciated by the skilled person, as well as enabling the spool 120 to return towards the neutral position when required, the force exerted by the biasing members 110a, 110b can be calibrated in combination with the electromagnetic force generated by the coils 108a, 108b to adjust the sensitivity of spool movement along the central axis C-C during operation.

Figure 5A:
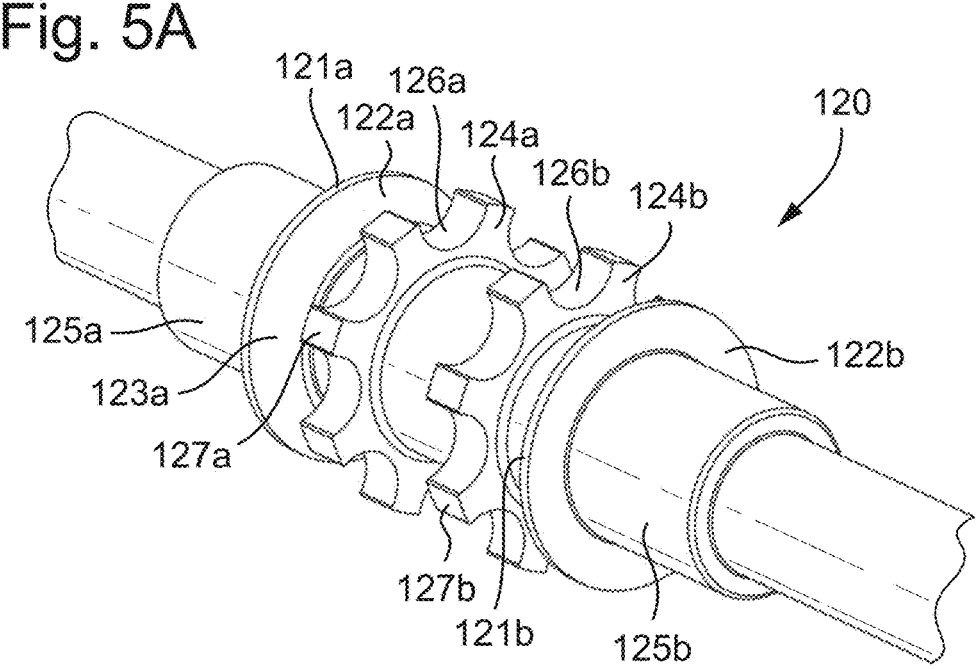
FIG. 5A is a perspective view of a spool in the servo valve assembly of FIG. 2.
Figure 5B:
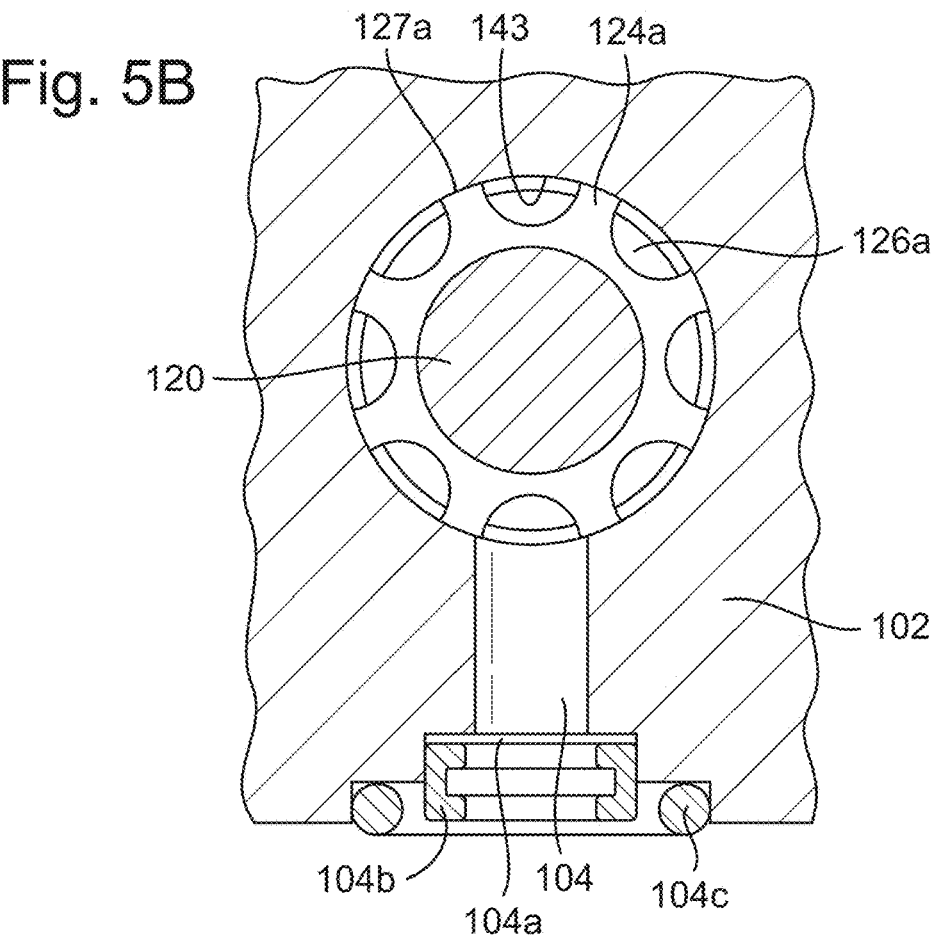
FIG. 5B is a cross-sectional view of the spool of FIG. 5A taken along line 5-5, when the spool is in situ in the servo valve assembly of FIG. 2.

With reference to FIGS. 5A and 5B, the spool 120 is shown in more detail. As well as retaining lands 122a, 122b, the spool 120 also includes a plurality of guiding lands 124a, 124b extending radially therefrom. The guiding lands 124a, 124b are arranged axially inboard of the retaining lands 122a, 122b. The guiding lands 124a, 124b include a plurality of circumferentially extending guiding surfaces 127a, 127b. The guiding surfaces 127a, 127b are spaced circumferentially apart by a plurality of grooves 126a, 126b that extend axially through the guiding lands 124a, 124b.

The guiding lands 124a, 124b are arranged to extend radially between the spool 120 and the third cylindrical portion 143 of the cavity 140. The guiding lands 124a, 124b extend such that guiding surfaces 127a, 127b make contact with the cavity surface defining the third cylindrical portion 143 in order to support the spool 120 positioning and hold it in place along the central axis C-C. As discussed above in relation to the jacket material and the retention members 109a, 109b, the amount of contact is configured to provide a balance between providing adequate support to the spool 120, without generating too much undue friction that can hinder spool movement along the central axis C-C. The grooves 126a, 126b allow fluid communication across the guiding lands 124a, 124b, such that the guiding lands 124a, 124b do not prevent communication of supply and return fluid pressures to the control port 104. Although eight guiding surfaces 127a, 127b and grooves 126a, 126b are equally spaced around the circumference of the lands 124a, 124b in the depicted example, in other examples, any suitable number and/or spacing of surfaces 127a, 127b and grooves 126a, 126b may be used. Also, although two guiding lands 124a, 124b are equally axially-spaced from respective ends 120a, 120b of the spool 120 in the depicted example, in other examples, any suitable number and/or spacing of guiding lands 124a, 124b may be used. In other examples, the guiding lands 124a, 124b may be omitted altogether.

In the depicted example, the guiding lands 124a, 124b are integral parts of the spool 120. However, in other examples, the guiding lands 124a, 124b may be formed from separate components that are attached thereto (e.g. by welding, brazing or interference fitting).

Figure 6:
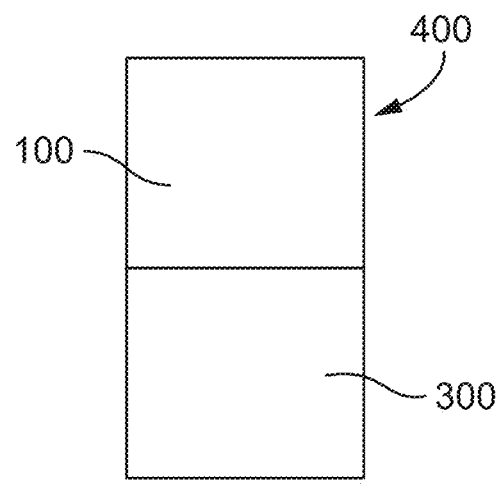
FIG. 6 is a box diagram showing an example of how the servo valve assembly of FIG. 2 is provided as part of a servo valve.

With reference to FIG. 6, an example servo valve 400 is depicted in accordance with the present disclosure. The servo valve 400 comprises the servo valve assembly 100 and an actuator arrangement 300 connected downstream thereof. The servo valve assembly 100 is used as a "pilot stage" in the servo valve 400 for controlling movement of the actuator arrangement 300. As is known in the art, the actuator arrangement 300, in addition to or instead of comprising one or more actuators (not shown), may include a spool valve (not shown) to help amplify the movements of the servo valve assembly 100 to provide a suitable actuation force. As discussed above, the servo valve assembly 100 may be separate from the arrangement 300 and connected thereto, e.g. via pin 101, or may be an integral part of the servo valve 400.

The invention claimed is:

1. A servo valve assembly, comprising:
a housing defining a cylindrical cavity having a central axis (C-C), wherein the cavity includes a first cylindrical portion having a first diameter ($D_1$), a second cylindrical portion having a second diameter ($D_2$), a third cylindrical portion arranged axially between the first and second cylindrical portions having a third diameter ($D_3$) smaller than the first and second diameters ($D_1$, $D_2$), and a pair of transition portions defining opposing conical cavity surfaces that each connect a respective one of the first and second cylindrical portions with the third cylindrical portion;
a spool disposed in the cavity and co-axially aligned with the central axis (C-C);
wherein the spool comprises a pair of blocking members projecting radially therefrom, and each of the blocking members defines a conical blocking surface opposing a respective one of the conical cavity surfaces to define a fluid flow passage therebetween;
wherein a cone angle (θa, θb) of each conical blocking surface relative to the central axis (C-C) is equal to a cone angle (θa, θb) of the opposing conical cavity surface relative to the central axis (C-C);
wherein the spool is moveable along the central axis (C-C) to vary a flow area of the flow passages between the conical blocking surfaces and the conical cavity surfaces; and
wherein the spool further comprises a pair of retaining lands extending radially from the spool and disposed axially inboard of the blocking members, the retaining lands each contacting a respective one of the blocking members to provide support thereto and configured to allow fluid communication from the flow passages to the third cylindrical portion.

2. The servo valve assembly of claim 1, wherein the retaining lands each comprise a conical surface around their circumference.

3. The servo valve assembly of claim 2, wherein each conical surface has a cone angle (θa, θb) relative to the central axis (C-C) that is equal to the cone angle (θa, θb) of the conical blocking surface of the respective blocking member.

4. The servo valve assembly of claim 1, wherein the spool further comprises a pair of guiding lands extending radially from the spool and disposed in the third cylindrical portion, the pair of guiding lands configured to contact a cavity surface defining the third cylindrical portion to support the spool in place along the central axis (C-C), wherein the guiding lands each define a plurality of circumferentially extending guiding surfaces spaced circumferentially apart by a plurality of grooves that extend axially through the guiding lands, wherein the guiding surfaces contact the cavity surface defining the third cylindrical portion and the plurality of grooves allow fluid communication axially across the guiding lands.

5. The servo valve assembly of claim 4, wherein the plurality of guiding surfaces and the plurality of grooves are equally spaced around the circumference of the guiding lands.

6. The servo valve assembly of claim 1, wherein the housing further comprises a fluid supply port opening into the first cylindrical portion, a fluid return port opening into the second cylindrical portion and a fluid control port opening into the third cylindrical portion.

7. The servo valve assembly of claim 1, further comprising a pair of opposing biasing members that are configured to bias the spool in opposing axial directions along the central axis (C-C) such that each conical blocking surface is biased towards the opposing conical cavity surface.

8. The servo valve assembly of claim 7, wherein a first of the pair of biasing members is disposed in the first cylindrical portion and a second of the pair of biasing members is disposed in the second cylindrical portion.

9. The servo valve assembly of claim 8, wherein the second biasing member is configured to provide a greater biasing force than the first biasing member.

10. The servo valve assembly of claim 1, further comprising a coil surrounding a first portion of the spool, wherein the coil and the spool are configured to generate an electromagnetic force that moves the spool along the central axis (C-C) when the coil is energised with an electric current to vary the flow area of the flow passages between the conical blocking surfaces and the conical cavity surfaces.

11. The servo valve assembly of claim 10, wherein the coil comprises a pair of coils spaced axially apart and outboard of the blocking members, each coil surrounding opposing axial portions of the spool.

12. The servo valve assembly of claim 11, wherein the cavity further comprises a fourth cylindrical portion and a fifth cylindrical portion axially outboard of the first and second cylindrical portions, wherein a respective one of the pair of coils is disposed in the fourth and fifth cylindrical portions.

13. A method of controlling the servo valve assembly of claim 10, the method comprising:
   applying an electric current to the coil to generate an electromagnetic force that moves the spool along the central axis (C-C) in a first axial direction;
   reversing the polarity of the electric current; and
   applying the reversed polarity electric current to the coil to generate an electromagnetic force that moves the spool along the central axis (C-C) in a second axial direction opposite the first axial direction.

* * * * *